Figure 1:
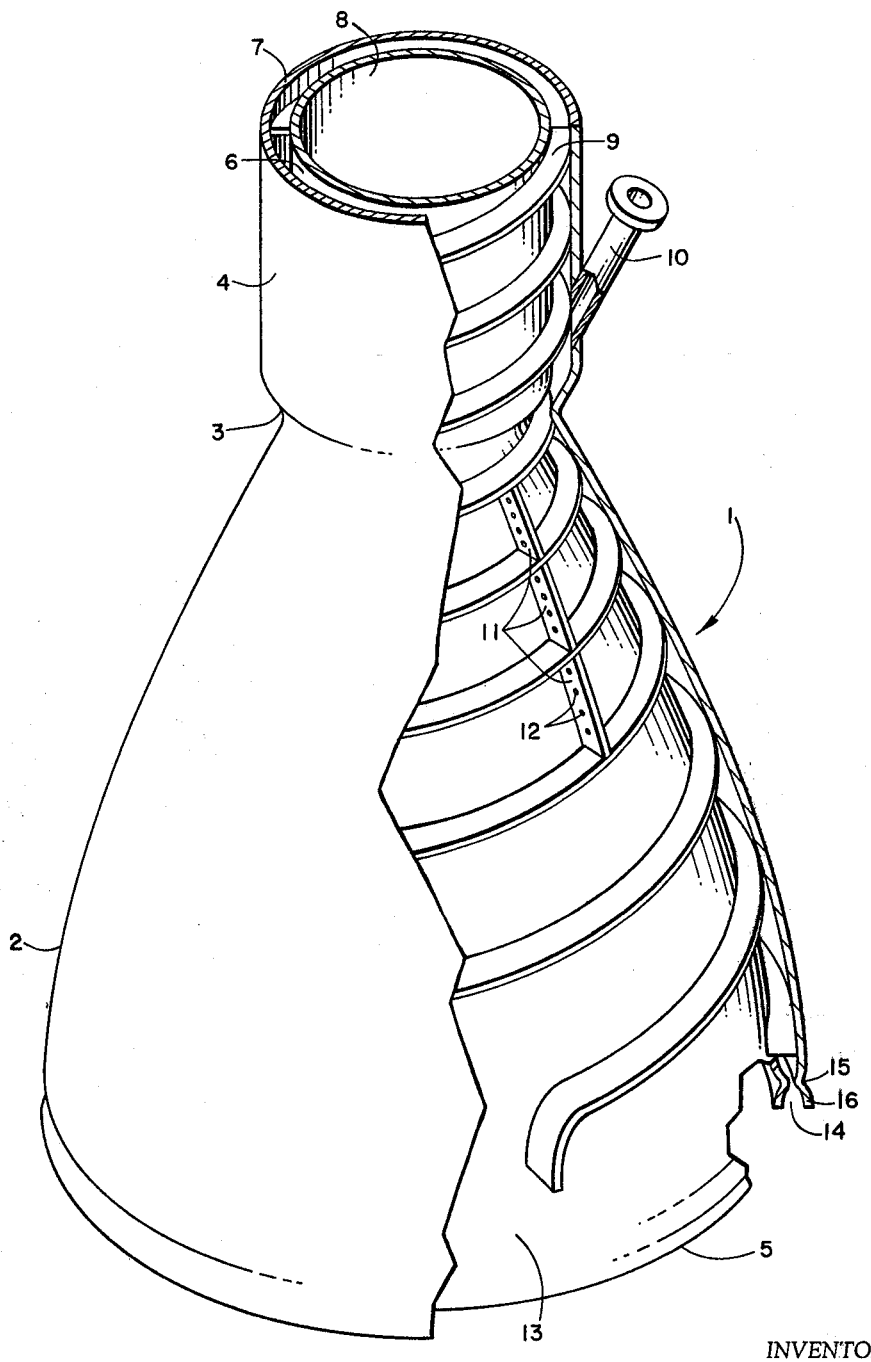

INVENTORS
ROBERT D. JONES
ROBERT N. MACDONALD
BY CHARLES P. MORSE

*Donald W. Graves*
ATTORNEY

Aug. 23, 1966 R. D. JONES ET AL 3,267,664
METHOD OF AND DEVICE FOR COOLING
Filed March 19, 1963 3 Sheets-Sheet 2
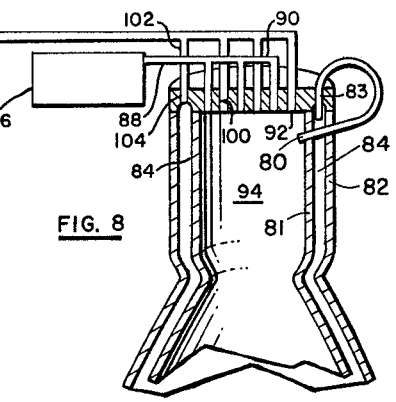
FIG. 8
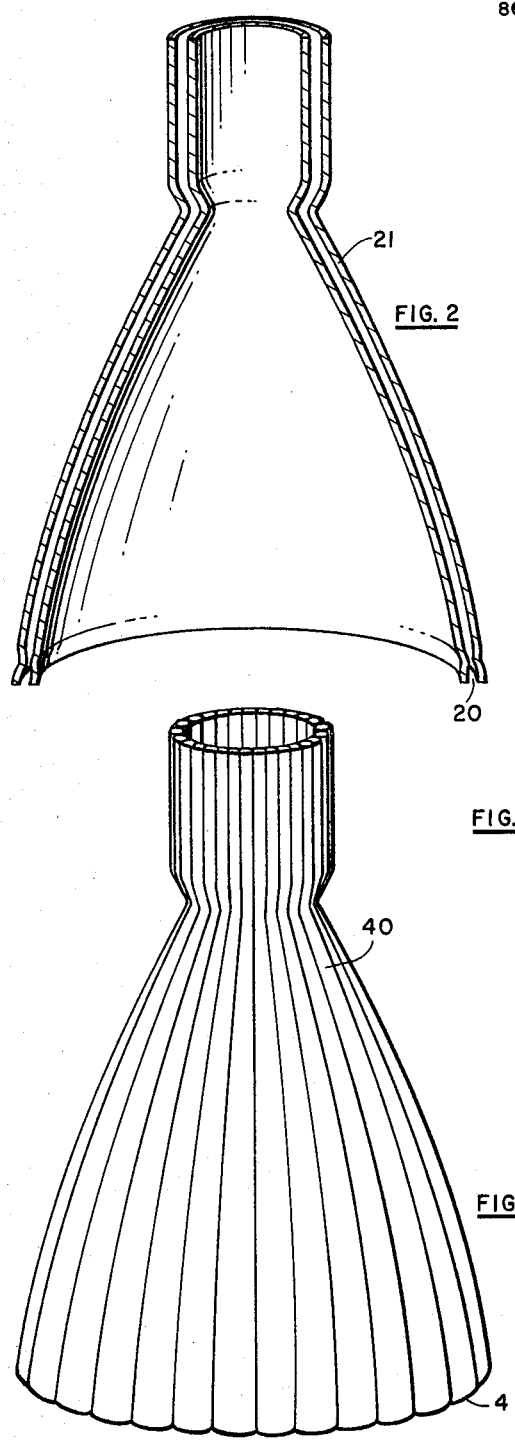
FIG. 2
FIG. 4
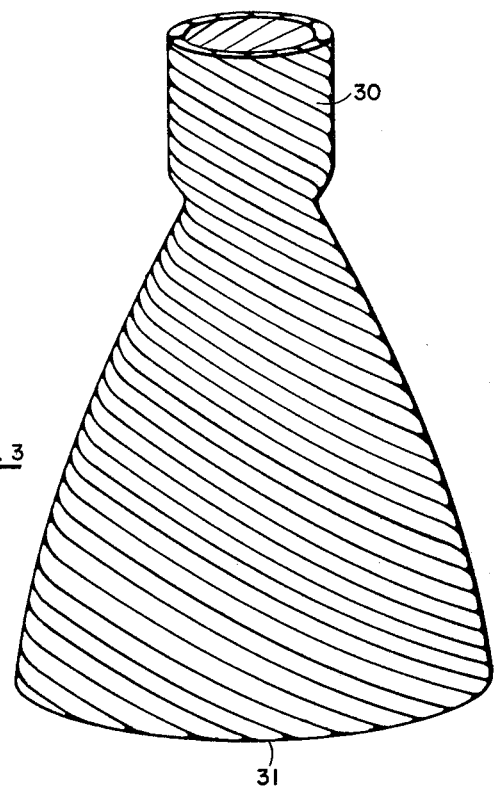
FIG. 3
INVENTORS
ROBERT D. JONES
ROBERT N. MACDONALD
BY CHARLES P. MORSE
*Donald W. Draver*
ATTORNEY Aug. 23, 1966   R. D. JONES ET AL   3,267,664
METHOD OF AND DEVICE FOR COOLING
Filed March 19, 1963   3 Sheets-Sheet 3

INVENTORS
ROBERT D. JONES
ROBERT N. MACDONALD
BY CHARLES P. MORSE

*Donald W. Draver*

ATTORNEY

United States Patent Office 3,267,664
Patented August 23, 1966

3,267,664
METHOD OF AND DEVICE FOR COOLING
Robert D. Jones, Canoga Park, Robert N. Macdonald, Los Angeles, and Charles P. Morse, Pacific Palisades, Calif., assignors to North American Aviation, Inc.
Filed Mar. 19, 1963, Ser. No. 266,445
6 Claims. (Cl. 60—35.3)

This invention relates to cooling of thrust chambers for rocket engines and the like.

More particularly, this invention relates to a thrust chamber construction whereby the walls of the thrust chamber are non-regeneratively cooled with coolant which, in addition to cooling, contributes thrust to the rocket engine.

During firing of a rocket engine, the thrust chamber walls are exposed to extremely high temperatures. To cool the walls, various approaches have been made. Among these is the regenerative cooling type which uses a coolant pumped through thrust chamber cooling passages. This coolant may be one or both of the propellants (usually the fuel) and after being pumped or forced into heat exchange relationship with the walls of the thrust chamber is injected into the combustion chamber of the rocket engine. This system has the advantage of cooling the thrust chamber walls with negligible system energy losses. A disadvantage is the necessity of pumping the fuel through the coolant passages and into the combustion chamber which requires a relatively high pumping head to overcome the coolant passage pressure drop and other pressure losses. It also involves a substantial wet weight penalty due to the liquid in the cooling passages.

Another cooling concept is commonly referred to as non-regenerative cooling which, in its broader aspect, means that a coolant is used which is not injected into the combustion chamber. An example of this is disclosed in United States patent application Serial No. 864, now abandoned, assigned to the assignee of this invention. However, in this as well as other non-regenerative cooling applications for rocket engines and the like, energy is lost when the coolant is dumped overboard since the coolant does not add to the thrust.

The subject invention falls within the category of non-regenerative cooling and has as one of its more important features the ability to use the dump coolant as a source of thrust with little or no loss in system specific impulse.

System specific impulse is a measure of the performance of the rocket engine itself, calculated on the basis of total thrust produced and propellant flow and may be expressed as follows:

$$I_{ss} = \frac{F_t}{W_t} = \frac{F_p + F_s}{W_p + W_s}$$

where:
$F_t$=total thrust produced by system expressed in pounds,
$F_p$=thrust produced by primary flow in the thrust chamber (pounds),
$F_s$=thrust produced by secondary flow through the coolant passages (pounds),
$W_t$=flow rate of total flow (pounds/second),
$W_p$=flow rate of secondary flow (pounds/second), and
$I_{ss}$=system specific impulse (seconds).

This concept employs a small percentage of the total propellant flow for cooling thrust chamber walls, although in some applications (notably solid rockets), a separate liquid is supplied. The flow enters coolant passages at the injector end of the chamber, flashes into vapor, and this gas then flows axially or helically the length of the thrust chamber and is finally discharged or dumped at the periphery of the nozzle exit through its own nozzle. Because the propellant coolant flow is discharged at a reasonably high temperature and velocity, degradation of overall thrust chamber performance does not result. While this is the basic concept on which this invention is based, several modifications and extensions of the basic concept will become apparent as this description proceeds. This concept may be termed "dump cooling."

One embodiment of this invention comprises a thrust chamber in which the coolant flows in a helical path around the thrust chamber with the coolant being heated and expanded so as to pass through a nozzle portion at the exit plane of the nozzle, thus adding thrust to the vehicle. This thrust is in addition to that produced in the thrust chamber itself.

Another feature of this invention is the provision for a thrust creating coolant in which the coolant is initially heated by combustion gases to facilitate greater cooling efficiency, for example, to raise the liquid temperature to its flash point.

Another feature of this invention includes the introduction of a portion of the coolant into the combustion chamber (such as in film or transpirational cooling) so as to aid in cooling the interior walls of the combustion chamber with only the nozzle being dump cooled.

Another feature of this invention is to use a portion of the propellant as a coolant medium in addition to creating thrust in which only an extension of the nozzle is cooled using this concept.

Another feature of this invention includes means by which a portion of the combustion chamber gases are introduced into the coolant passages so as to pre-heat the coolant for greater cooling efficiency, particularly with coolants having poor cooling capabilities at very low temperatures, such as hydrogen.

Accordingly, it is an object of this invention to provide an improved thrust chamber for rocket engines and the like in which a non-regenerative cooling system is provided which contributes to the thrust of the rocket engine with little or no loss in system specific impulse.

It is an object of this invention to provide an improved thrust chamber for rocket engines and the like in which a portion of the coolant is injected into the combustion chamber while the remainder is accelerated as it leaves the thrust chamber exit plane to aid in thrust.

It is another object of this invention to provide a thrust chamber around which a coolant is passed and accelerated, and from which a portion of the combustion gases in the combustion chamber is tapped off to initially heat the coolant so as to obtain maximum efficiency in cooling.

Figure 5:
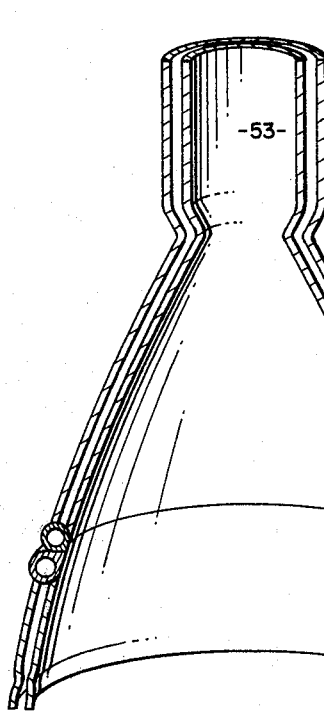
Figure 6:
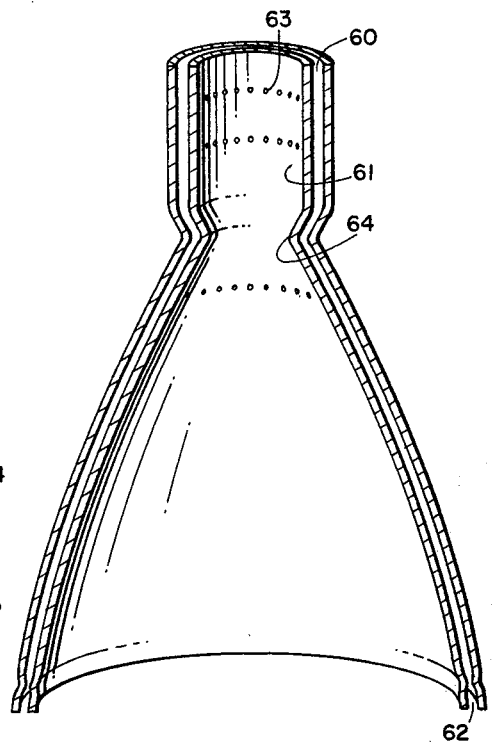
Figure 7:
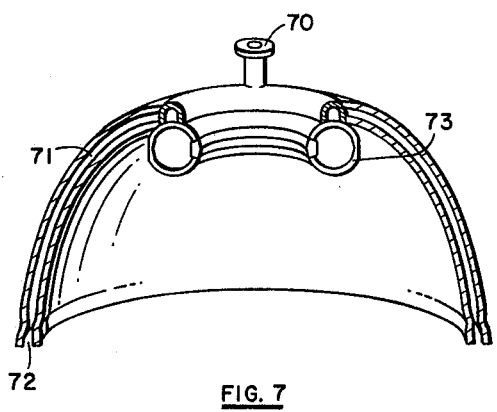

Other and more specific objects of this invention will become apparent as this description proceeds taken in conjunction with the drawings in which:

FIG. 1 is a perspective view of one embodiment of this invention which utilizes a spiral dump-coolant path and is partially cut away to show structural parts, FIG. 2 is another embodiment of this invention in cross-sectional view, in which the dump coolant flows axially, FIG. 3 is a perspective view of another embodiment of this invention showing the use of spiral tubes, FIG. 4 is a perspective view of another embodiment of this invention which uses longitudinal coolant tubes, FIG. 5 is a view in cross-section of still another embodiment of this invention where only the lower portion of the nozzle is dump-cooled, FIG. 6 is a cross-sectional view of still another embodiment of this invention, FIG. 7 is a cross-sectional view of another embodiment of this invention in a toroidal combustion chamber application, and FIG. 8 is a cross-sectional view of another embodiment of this invention illustrating the use of a tap-off port for initially heating the coolant.

Referring now to FIG. 1, a thrust chamber incorporating novel features of one embodiment of this invention is shown. Designated generally as 1 is a thrust chamber which includes a nozzle section 2, throat region 3 and combustion chamber region 4. Although not shown, an injector is provided for injecting propellants into the combustion chamber. This injector is conventional and is omitted here for sake of convenience. In the normal operation of thrust chambers of this sort, fuel and oxidizer are injected through the injector into combustion chamber 4, ignited in a conventional manner (such as by a spark plug, hypergolic slug or other means), accelerated in throat region 3 and expanded into nozzle portion 2. The combusted gases leave the exit plane which is shown generally at 5. A common propellant combination includes liquid hydrogen and liquid oxygen. The hydrogen because of its low molecular weight and good heat absorption qualities is used as the dump coolant for the thrust chamber. Accordingly, hydrogen, to cool the thrust chamber walls as shown in FIG. 1, is injected or otherwise placed in the region 6 formed by outside wall 7 and inner wall 8. This hydrogen as it passes in a spiral path due to the spacers 9 becomes heated due to the combustion of propellants in the combustion chamber 4. Accordingly, the liquid hydrogen, as it is heated, is expanded into a gas via flash vaporization. In this particular embodiment, the liquid hydrogen enters region 6 at a temperature of approximately 40–60° R. and about 600 p.s.i.a. The coolant can be heated to this temperature by a conventional turbopump and turbine exhaust heat exchanger not shown. The thrust chamber 8 wall temperature is less than or equal to approximately 1600° F. A dump-coolant tap-off device 10 is optionally provided should warm gas be needed for tank pressurization or for some auxiliary use. As the coolant traverses around the inner wall 8, the hydrogen will absorb heat and quickly experience an increase in temperature with subsequent vaporization, while at the same time cooling the thrust chamber wall. Indicated at 11 are orifice plates with orifices 12 provided so that the coolant is throttled to approximately 150 p.s.i.a. to reduce stress problems Finally, as the heated hydrogen gas is expanded, it will exit at 13 passing through nozzles 14 which are used to expand the dumped gas and thereby create thrust. Nozzle 14 includes a throat region 15 and expansion section 16 ending at exit plane 5. The ratio of the throat area 15 to the exit area at 5 is not critical. The dimensions can be varied to comply with heat flux requirements, flow area and other factors. The area of throat 15 to the nozzle exit area 16 at 5 may range, for example, up to 1:100. The hydrogen gas which is dumped through throat area 14 provides a vacuum specific impulse of approximately 431 seconds, when using hydrogen under conditions presented herein, which equals the specific impulse of the primary hot gas expanding through thrust chamber nozzle 2. Thus, it can be seen that by providing a portion of one of the propellants to flow around the space between the thrust chamber inner and outer shells, the thrust chamber wall is cooled and at the same time the coolant gas is expanded to provide some thrust to the rocket engine in addition to that of the main thrust chamber assembly.

Although not considered to be an essential part of this invention, the thrust chamber walls may be formed by high energy forming spin forging, rolling or by any other convenient method. In addition to the fuel specified as hydrogen and the oxidizer as liquid oxygen, it is within the scope of this invention to provide other propellants and coolant constituents. Thus, solid propellants or liquid propellants can be used as the main source of thrust while hydrogen, methane or ammonia can be injected into the space between thrust chamber wall 7 and 8 and used as dump coolant. It is also within the scope of this invention to use as dump coolant any low molecular weight fluid, which exhibits good heat absorbing qualities.

It has been found that the amount of hydrogen, for example, necessary to pass between the two thrust chamber walls for cooling purposes is approximately 1 percent or less of the total thrust chamber hydrogen flow. In tests performed on a thrust chamber at the 1,000 pound thrust level using liquid oxygen and RP–1 propellants with the thrust chamber regeneratively cooled by RP–1, the system specific impulse is normally between 200 and 209 seconds. From similar tests using the same hardware and primary propellants, but with dump cooling using hydrogen, the system performance ranged from 205 to 236 seconds. An average of these tests demonstrated that the specific impulse was improved approximately 7.5 percent with hydrogen dump cooling.

In addition to improving this specific impulse of the total thrust chamber by introducing the hydrogen into the coolant passages and dumping it overboard, the pumping requirement is relaxed. A high pumping requirement exists in regeneratively cooled systems to pump the coolant through the coolant passages back to the injector for injection into the combustion chamber. Another advantage in this type of construction is relaxation of stresses in the thrust chamber walls. The use of a coolant jacket pressure near the same value as the combustion chamber pressure allows for a small differential pressure across the inner shell wall to the combustion zone. As the coolant flow traverses the thrust chamber, the pressure is reduced because of frictional and momentum pressure losses. The coolant pressure diminishes in value as the exit is approached (where the passage diameter is the largest) so that only small stresses exist at the exit as compared to the normal regeneratively cooled chamber. The use of a higher bulk temperature hydrogen coolant (which is described later) also contributes to the lowering of longitudinal wall thermal stresses for tube wall designs because of a smaller temperature differential between the hottest and coldest portion of the wall.

Another advantage of this concept resides in the ability to use low cost thrust chambers such as simple explosively formed shells. In addition, a light weight assembly can be used, since stresses are less and coolant requirements are decreased. Finally, by providing a tap-off, a source of warm gas is provided for accessory consumption and for propellant tank pressurization. These advantages are important in rocket engines in which it is necessary to save on weight as much as possible. In prior art examples in which the coolant is used in a regenerative manner, the passages were under a relatively high pressure. On the other hand, in non-regenerative cooled prior art examples, since the coolant did not provide the same specific impulse as the exiting thrust chamber gases, the system specific impulse was reduced.

FIG. 2 illustrates another embodiment of this invention which is similar to FIG. 1 except for the manner in which the coolant gas is passed around the outside of the inner combustion chamber wall. In this modification, the operation is similar to FIG. 1 except that instead of passing the coolant in a spiral path around the thrust chamber, the hydrogen gas is flowed in a more axial direction with a nozzle arrangement at 20 similar to that shown in FIG. 1. In this modification, as in all of the other modifications, the nozzle portion 20 in the coolant passage and 13 in FIG. 1 can be constructed in a variety of ways. For example, the nozzle may be an annular nozzle with the thrust chamber walls squeezed together. Alternatively, a series of apertures may be provided to create the nozzle effect. In FIG. 2, the coolant passage 21 is indicated as being an annular passage.

In FIG. 3, the operation is similar to that as described with reference to FIG. 1 except that instead of using a double wall construction and the separation spacers, a group of spiral-wound tubes 30 may be provided. As in the other embodiments, the coolant gas is accelerated through a nozzle indicated generally at 31 and dumped at the exit plane of the thrust chamber.

In FIG. 4, an arrangement is shown similar to that shown in FIG. 2 except that instead of a double wall construction, straight tubes 40 may be provided with nozzles 41.

FIG. 5 illustrates another use of the dump cooling of this invention. In this embodiment, a conventional coolant may be introduced through port 50 and passed between walls 51 and 52 and injected into the combustion chamber 53 by means not shown. This is a conventional arrangement and forms no part of this invention. This is the so-called regenerative cooling type in that the fuel cools the thrust chamber and is then injected into the combustion chamber. However, as in all regenerative cooling systems, a high pumping capacity is necessary. To lessen this capacity, this embodiment uses another coolant introduction port 54. A dump coolant is injected into port 54 and thence into the passage formed between walls 55 and 56 similar to the previously described embodiments. After being heated, the coolant is then accelerated through nozzle region 57, passing out of the exit plane and adding to the thrust of the vehicle. In addition, the walls 56 are cooled.

FIG. 6 illustrates still another embodiment of this invention utilizing the basic principle while differing in some respects. This modification is similar to that shown in FIG. 2 although it is within the scope of this invention to use helical passages, axial tubes or spiral-wound tubes. As in the previous embodiments, a coolant (such as hydrogen) is injected into the region 60 where it is heated by the combustion chamber wall 61. As the coolant gas expands, it will cool thrust chamber wall 61 and after passing out of the nozzle arrangement 62 adds specific impulse to the system. However, if the hydrogen is introduced into the area 60 at a temperature in the neighborhood of 40–60° R., the hydrogen has a low capability of heat absorption at this temperature. Since this is a region wherein very difficult cooling problems exist, it is advantageous to provide some means by which a greater amount of heat can be absorbed. This is accomplished by providing apertures 63 through which a portion of the hydrogen introduced into space 60 may pass into the thrust chamber. Although shown as apertures, it is within the scope of this invention to use a porous chamber wall construction 61. These apertures are advantageously placed in those areas where critical heat transfer is present. This can be in the combustion chamber itself or the throat region 64. This is what may be termed as transpirational or film cooling. As the coolant gas passes between the thrust chamber walls, a portion is injected through the apertures shown into the combustion chamber. This coolant gas, being at a lower temperature, traverses the interior of the inner wall 61 and provides additional cooling.

FIG. 7 illustrates still another embodiment of this invention which is similar in respects to the previously described embodiments except for the difference in application. Here the coolant is introduced into port 70 passing through space 71 and out the nozzle 72 as in the previously described embodiments. This thrust chamber construction in other respects is similar to that described in the U.S. Patent application, Serial Number 243,202, assigned to the assignee of this invention. The coolant may be one of the propellants, if desired, and passed around the combustion chamber tubes 73 prior to entering space 71 to aid in cooling the combustion chamber wall.

FIG. 8 schematically illustrates an important embodiment of this invention. As stated with reference to FIG. 6, should hydrogen be used as coolant, the hydrogen gas at certain low temperature ranges has a low heat absorption capability. It should also be noted that the maximum heat transfer cooling rates will not necessarily occur at the greatest difference between the coolant wall temperature and the hydrogen at low bulk temperature. To initially heat the hydrogen gas to a temperature at which its heat absorption qualities are greater, say in the neighborhood of 200° R., a portion of the combustion gases are tapped off from the combustion chamber and introduced into the coolant passages along with the coolant (hydrogen) so as to initially heat the hydrogen. A source of oxidizer such as liquid oxygen is shown at 86, which by means of conduit 88 and manifold 90, leads the oxidizer through injector orifices 92 into combustion chamber 94. Similarly, fuel such as liquid hydrogen stored in tank 96 is led by means of conduit 98 into injectors 100 and eventually into combustion chamber 94. A branch conduit 102 is provided so that a portion of the fuel is diverted into injector orifices 104 and into cooling annulus 84. This is done by providing a tap such as 80 which passes a portion of the combustion chamber gases through the thrust chamber wall 81 and wall 82. The gases are then injected into the space 84 formed by the walls 81 and 82 by means of the injector 83. By this arrangement, the hydrogen is initially heated to a higher temperature so as to improve the heat absorption qualities. In this manner the fuel and oxidizer in combustion chamber 94 undergo combustion to provide combustion gases under a relatively high pressure. When the fuel such as liquid hydrogen is injected directly into the cooling annulus 84, the fuel is heated by the combustion chamber wall to convert it to a gas with an increase in pressure. However, this pressure is not as great as that in combustion chamber 94 since combustion does not take place in the cooling annulus. Accordingly, the gas can be tapped off from chamber 94 into cooling annulus 84 which is at a lower pressure. It is also within the scope of this invention to use the tapped-off gas flow as the dump coolant, per se. This is possible in an oxygen and hydrogen propellant system because a tapped gas from the combustion zone which is very rich in hydrogen can be made available at the desired temperature. This is accomplished by providing that the propellant introduced near the periphery of the injector is practically all hydrogen. The hydrogen is then initially heated in the combustion chamber and by means of the tap-off flows into the coolant passages wherein the previously described dump cooling will occur as the hydrogen is further heated.

Referring again to FIG. 6, instead of using apertures 63 or a sintered or porous wall, it is also within the scope of this invention to inject a fuel or hydrogen rich mixture at the periphery of the injector included within the thrust chamber itself as previously described. In this way a rich hydrogen mixture is passed along the interior of the inner wall 61 so as to aid in cooling. This differs from FIG. 8 in that a tap-off is not provided.

Thus, it can be seen that by using a portion of the propellant as a coolant for the thrust chamber walls and in addition by providing a source of thrust, a relaxation of pump requirements and the elimination of heavy thrust chamber wall sections results.

Whereas preferred embodiments of the present invention have been shown in the drawing and accompanying description, it should be obvious to those skilled in the art that various changes may be made in the form of the invention without effecting the scope thereof.

What is claimed is:

1. In a thrust chamber assembly having a source of propellant, an injector for introduction of said propellant into a combustion chamber and a nozzle portion, that improvement which comprises:
    means adapted to convey a portion of said propellant into a heat exchange relationship with said thrust chamber assembly, said propellant being adapted to expand when heated,
    means to convey a portion of the combustion gases from said combustion chamber to said propellant conveying means whereby said propellant is initially heated, and means associated with said propellant conveying means and said thrust chamber assembly to accelerate said propellant and to allow flow of said propellant overboard of said thrust chamber assembly, whereby said thrust chamber assembly is cooled and thrust is imparted to said thrust chamber assembly.

2. A thrust chamber according to claim 1 in which said propellant is hydrogen.

3. A method of cooling a thrust chamber and imparting thrust thereto which comprises:

providing a propellant at a first temperature, said propellant having a higher heat absorption charcteristic at a higher temperature than at said first temperature, diverting a portion of said propellant and conveying said portion in heat transfer relationship to said thrust chamber so as to expand said propellant, pre-heating said portion whereby the heat absorption characteristics of said propellant is increased, accelerating said portion of said propellant, allowing said propellant portion to expand overboard, whereby said thrust chamber is cooled by said propellant portion and thrust is imparted to said thrust chamber by said propellant portion.

4. A method according to claim 3 in which said propellant is hydrogen.

5. A method according to claim 4 in which said hydrogen is pre-heated to approximately 200° R.

6. In a thrust chamber assembly having an injector, a combustion chamber and a nozzle portion, that improvement which comprises;

means adapted to convey a selected propellant in heat exchange relationship with said thrust chamber assembly, said propellant being adapted to expand when heated, means to inject selected propellant adjacent the periphery of said injector, means to convey a portion of the combustion gases from said chamber adjacent the periphery thereof to said propellant conveying means whereby said selected propellant is initially heated, and means associated with said propellant conveying means and said thrust chamber assembly to accelerate said propellant and to allow flow of said propellant overboard of said thrust chamber assembly whereby said thrust chamber assembly is cooled and thrust is imparted to said thrust chamber assembly.

References Cited by the Examiner

UNITED STATES PATENTS

| 2,749,706 | 6/1956 | Goddard | 60—35.6 |
| 2,892,308 | 6/1959 | Ferri et al. | 60—39.66 X |
| 2,902,823 | 9/1959 | Wagner | 60—35.6 |
| 2,937,494 | 5/1960 | Johnson | 60—39.66 X |
| 3,069,850 | 12/1962 | Ledwith et al. | 60—35.6 X |
| 3,116,603 | 1/1964 | Hausmann | 60—35.6 X |

FOREIGN PATENTS 1,128,6086 8/1956 France.

OTHER REFERENCES

"Hydrogen Harnessed," Time Magazine, December 1959, page 37.

"Propulsion," Aviation Age, November 1957, page 59.

MARK NEWMAN, *Primary Examiner.*

SAMUEL LEVINE, *Examiner.*

D. HART, *Assistant Examiner.*